Nov. 27, 1934.　　　P. A. MINNIS　　　1,982,116
FRUIT DRIER
Filed Oct. 7, 1931
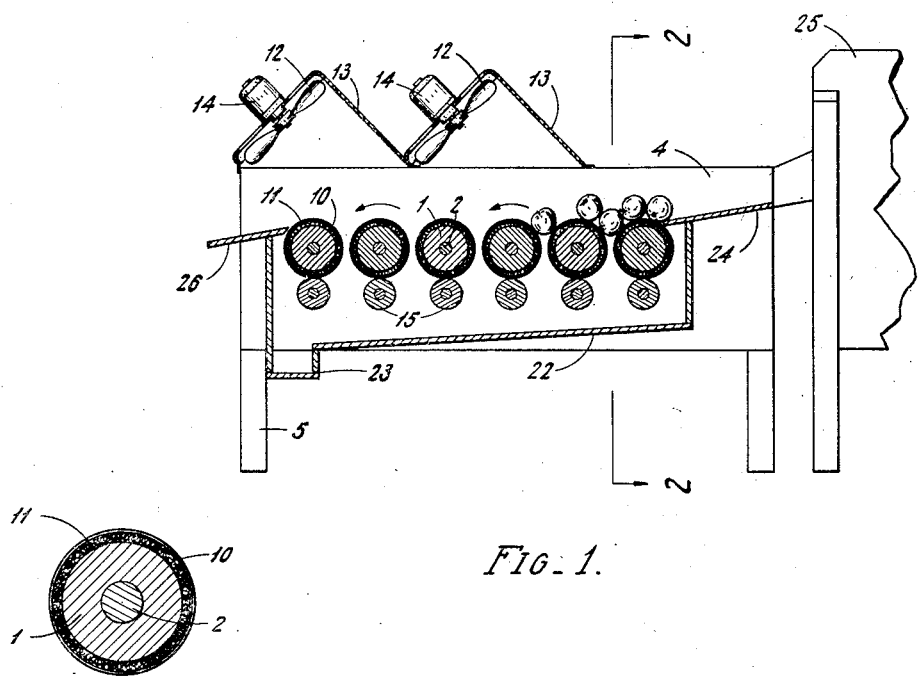
FIG. 1.
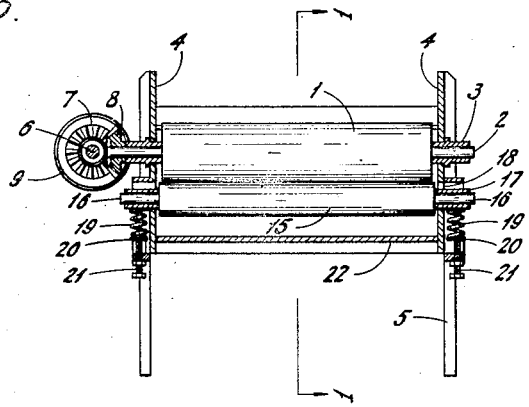
FIG. 3.
FIG. 2.
INVENTOR.
Philip A. Minnis Patented Nov. 27, 1934

1,982,116

UNITED STATES PATENT OFFICE 1,982,116

FRUIT DRIER

Philip A. Minnis, San Jose, Calif., assignor to Food Machinery Corporation, San Jose, Calif., a corporation of Delaware Application October 7, 1931, Serial No. 567,402

4 Claims. (Cl. 34—1)

This invention relates to drying apparatus such as may be used to dry fruit and the like and has particular reference to an improved construction of such apparatus wherein I am able to obtain improved results over previously known devices.

Heretofore it has been the common practice to construct fruit driers with a chamber or housing through which extends a travelling conveyor adapted to convey the fruit from a point of inlet to a point of delivery. The drying means is usually arranged adjacent the conveyor so that the fruit is subjected to the action of the drying means as it is carried through the housing by the conveyor.

In the construction of drying apparatus embodying the principles of my invention a portion at least of the drying means is incorporated in the conveyor itself, so that the conveyor serves the double purpose of drying the fruit and also conveying it through the drier. It is contemplated that auxiliary drying means may be also utilized if desired, but on account of the drying action afforded by the conveyor such auxiliary drying devices need not be so extensive as heretofore necessary in order to procure the desired results.

The consequence of such improved construction is that I am enabled to provide a drier which is less complicated and less expensive than other forms, as well as occupying a minimum amount of floor space.

It is, therefore, an object of this invention to provide a drier in which the conveying means serves to dry the fruit carried thereby or assists the drying process in the event additional or auxiliary drying means is provided.

More specifically, it is an object of the invention to construct a fruit drier in which is provided a conveyor including a plurality of absorbent supporting rollers, and having means for expressing the moisture from the rollers so as to maintain their drying efficiency.

With the above mentioned and other objects in view, the invention consists in the novel construction and combination of parts hereinafter described, illustrated in the accompanying drawing, and set forth in the claims hereto appended, it being understood that various changes and modifications may be resorted to without departing from the spirit or scope of the invention, and I deem myself entitled to all such changes and modifications as fall within the scope of the claims hereto appended. It will also be understood that while the invention is described in connection with the drying of fruit, it is not so limited but may be used to dry other articles as well, and the term "fruit" as used herein is intended to include such other articles.

Referring to the drawing, wherein like reference characters denote like parts throughout the several views:

Figure 1 is a side elevation of a preferred form of apparatus constructed according to the invention, taken along the lines 1—1 of Figure 2.

Figure 2 is an end elevation of the apparatus, taken along the line 2—2 of Figure 1.

Figure 3 is a cross section of one of the conveyor rollers drawn to an enlargened scale.

In the apparatus illustrated, the fruit to be dried is conveyed therethrough by means of a conveyor comprising a series of horizontally disposed supporting rollers 1 arranged in adjacent parallel relation and provided with shafts 2 journalled in suitable bearings 3 carried by the side walls 4 whereby a runway is provided for directing the fruit through the machine. The apparatus as a whole is supported by the legs 5.

Provision is made for driving all of the rollers simultaneously in the same direction by means of a longitudinal drive shaft 6 having secured thereto a plurality of bevel gears 7 adapted to mesh with corresponding bevel gears 8 keyed to the outer ends of the roller shafts 2. Power may be supplied to the pulley 9 from any suitable source to rotate the drive shaft 6. By this construction it will be seen that as the rollers are rotated in the direction of the arrows fruit may be deposited thereon and will be conveyed over the rollers by the rotation of the rollers augmented by the urge of oncoming fruit being fed to the rollers.

In order that the conveyor may serve as a drying means for the fruit, each of the conveyor rollers, as best shown in Figure 3, is provided with a covering of absorbent material 10 such as felt or the like. Where an absorbent material such as felt is used, which is likely to be scuffed during use, it is preferably protected by a covering of thin, porous material 11, such as loosely woven canvas or other net-like material.

Disposed above the absorbent conveyor rollers 1 are a plurality of air circulating means, comprising fans 12 mounted within fan housings or hoods 13 and driven by any suitable means, such as by electric motors 14. These fan housings are supported on the side walls 4 and are arranged at an angle inclined from the vertical so that the current of air induced by the fans 12 is directed against fruit passing through the machine at an angle from and opposed to the direction of travel of the fruit.

In the operation of the fans 12 the current of air created thereby is directed downwardly through the rollers 1, as well as upon the fruit. In this way the air current not only aids in drying the fruit as it passes beneath the fans but also evaporates moisture from the absorbent coverings of the rollers, thereby preventing their saturation by the moisture absorbed from the fruit.

It has been found, however, that the air current set up by the fans 12 is not sufficient to prevent the retention of such an amount of liquid by the absorbent rollers that their drying efficiency materially decreases during operation of the machine and to rectify this condition there is provided another means for removing moisture from the rollers. This means comprises a series of wringer rollers 15 arranged beneath the conveyor rollers 1 so as to be pressed into contact therewith. The wringer rollers are mounted on shafts 16 carried by bearings 17 which are vertically movable in slots 18 provided in the side walls 4. To provide the necessary pressure for forcing the wringer rolls against the rollers 1, a coil spring 19 is arranged below each bearing 17 and rests against a plate 20 carried on a screw 21. By adjusting the screws 21 the pressure of the wringer rolls against the absorbent rollers may be varied as desired.

As the moisture is expressed from the absorbent rollers it falls upon the inclined drip pan 22 and is directed to a trough 23 from which it may be discharged to any desired point of drainage.

In operation, the wet fruit may be delivered to the drier over a ramp 24 as it comes from the washer 25, and the rotation of the absorbent rollers 1 combined with the urging action of the oncoming fruit behind causes it to be advanced over the rollers. It is characteristic of this type of conveyor that the fruit is not advanced solely by the rotation of the conveyor rollers alone but the advancement is dependent upon the crowding action of additional fruit being fed to the conveyor, and, therefore, the speed of advance may be regulated by the rate the fruit is fed to the conveyor. In this manner the progress of fruit over the rollers may be closely governed.

As the pieces of fruit pass over the supporting rollers the moisture adhering to the fruit is transferred to the absorbent surfaces of the rollers, and is thereafter expressed by the wringer rollers 15, so that the drying efficiency of the absorbent material is maintained. Both the fruit and rollers are also subjected to a blast of air from the fans 12 which hastens the drying of the fruit and also aids in keeping the absorbent rollers dry. The completely dried fruit is discharged from the machine over the discharge ramp 26.

Having now described my invention and in what manner the same may be used, what I claim as new and desire to secure by Letters Patent is:

1. In a drying apparatus, means for supporting and conveying articles therethrough including rotatable supporting members mounted for rotation about fixed axes and having absorbent surfaces, a wringer roller beneath each supporting member adapted to express moisture therefrom, and means above said supporting members for directing a blast of air downwardly thereagainst.

2. In a drying apparatus, a plurality of fixed supporting rollers having absorbent surfaces and arranged to convey articles transverse their axes, means for rotating all the rollers in a common direction, means engaging said rollers for expressing moisture therefrom, and means above said rollers for directing a blast of air downwardly thereagainst.

3. In a fruit drying apparatus, a fruit supporting runway along which fruit may be advanced while undergoing treatment, said runway including a plurality of absorbent surfaced supporting rolls upon which a mass of fruit of mixed sizes may be advanced, means mounting said rolls for rotation upon fixed axes, means for driving said rolls, and wringer roller means associated with one or more of said absorbent surfaced rolls and mounted for operative engagement therewith to express moisture therefrom.

4. In a fruit drying apparatus, a fruit supporting runway including a plurality of rotatable absorbent surfaced supporting rolls over which a mass of fruit of mixed sizes may be advanced, means mounting said rolls for rotation upon fixed axes, means for driving said rolls, and a wringer roller disposed in operative engagement with each of said absorbent surfaced rolls to express moisture therefrom.

PHILIP A. MINNIS.